United States Patent [19]

Svensson

[11] 4,050,792
[45] Sept. 27, 1977

[54] OBSERVATION PORT ASSEMBLY

[75] Inventor: Ulf Svensson, Malmkoping, Sweden

[73] Assignee: Roger Ronny Jochen Svensson, Stockholm, Sweden

[21] Appl. No.: 653,609

[22] Filed: Jan. 29, 1976

[30] Foreign Application Priority Data

Mar. 12, 1975 Sweden ................................. 7502788

[51] Int. Cl.² ........................ G02B 5/00; G02B 25/04
[52] U.S. Cl. ...................................... 350/319; 350/252
[58] Field of Search ................. 350/319, 106, 105, 99, 350/175 E, 96, 30, 31, 21, 22, 20, 82, 85, 252, 301, 198, 68, 25, 27, 202, 204; 49/171

[56] References Cited

U.S. PATENT DOCUMENTS

| 1,708,746 | 4/1929 | Van Hofe | 350/31 |
| 2,491,758 | 12/1949 | Nichols et al. | 350/82 |
| 3,526,452 | 9/1970 | Dorn | 350/31 |
| 3,910,676 | 10/1975 | Fojtik et al. | 350/319 |

FOREIGN PATENT DOCUMENTS

| 40,580 | 7/1929 | Denmark | 350/319 |
| 381,095 | 9/1923 | Germany | 350/31 |

Primary Examiner—John K. Corbin
Assistant Examiner—B. W. delos Reyes
Attorney, Agent, or Firm—Holman & Stern

[57] ABSTRACT

An observation port assembly, arranged to be attached to a door and to permit a panoramic view with a maximum field of view of the area outside the door, including a boxshaped part, attachable to the outside surface of the door, having at least two optical viewing elements with wide angle properties arranged with the viewing oculars adjacent to each other and viewable from the inside of the door, the optical axis of said elements being arranged in a predetermined angle relationship between to adjacently arranged elements.

5 Claims, 5 Drawing Figures

U.S. Patent
Sept. 27, 1977
4,050,792
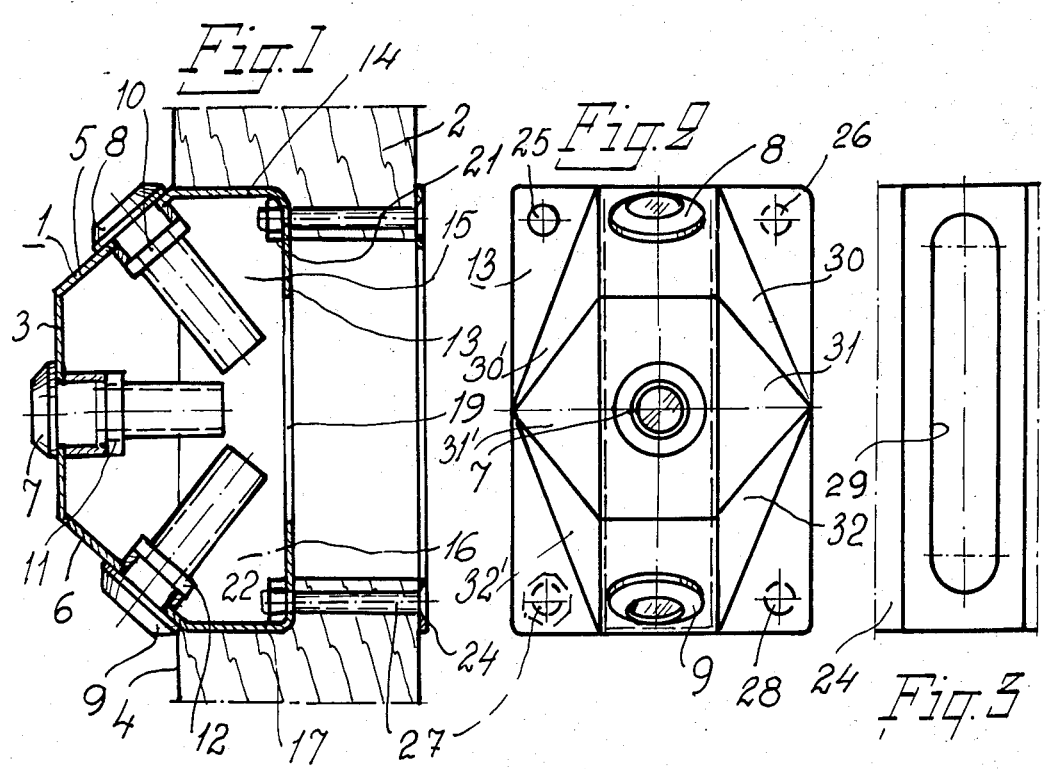
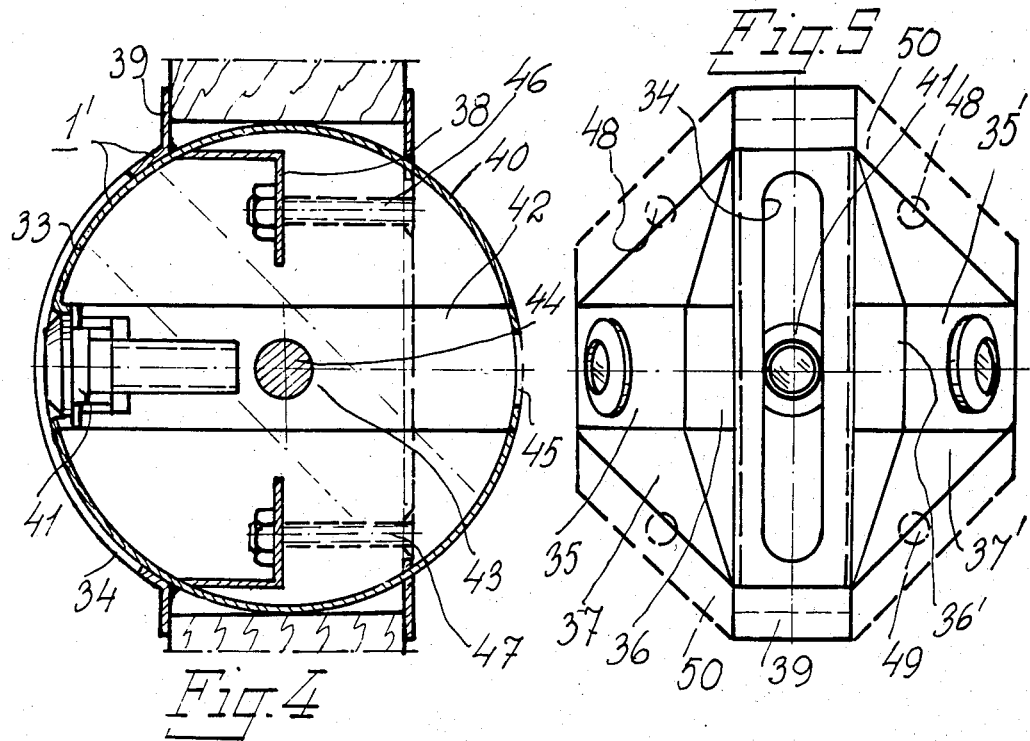

OBSERVATION PORT ASSEMBLY

FIELD OF THE INVENTION

The present invention concerns an observation port, intended to permit an increased field of view.

BACKGROUND OF THE INVENTION

It is previously known, e.g. at a front door, to attach an optical observation port assembly extending through the door, in order to obtain visual control of persons outside the door, before the door is opened; said previously known type of observation port includes an optical lense system, thus permitting a certain panoramic or wide angle effect.

However, it is a well known fact that this previously known type of observation port does not permit viewing of people or objects within such a large viewing sector, that the area outside the door can be completely viewed. Persons, or objects, have therefore been concealed from the eye of the viewer. As a consequence, concealed weapons and other objects have been surprisingly used against the viewer, when the door has been opened.

OBJECTS AND SUMMARY OF THE INVENTION

The object of the present invention is to disclose a solution, which completely eliminates previously known problems, arranged to permit a field of view exceeding 180°, without any change of position for the device in relation to the door. The last mentioned condition is of great importance, since visual control of the area outside the outside plane of the door preferably should be carried out without any indication of the control to persons within the viewing area.

The port hole according to the present invention is mainly characteristic thereof, that it includes a boxshaped part, attachable to the outside surface of a door, having at least two separately arranged optical viewing elements, arranged with the viewing oculars adjacent to each other and viewable from the inside of the door, the optical axis being arranged in a predetermined angle relationship to the optical axis of the adjacent element.

A further characteristic feature is that the part of the boxshaped part directed outwardly from the outside surface of the door is formed by a number of planes inclined towards each other to form a facetshaped surface, arranged without engagement surfaces for a tool.

Two embodiments of devices according to the present invention are more fully described below with reference to the accompanying drawing.

BRIEF DESCRIPTION OF THE FIGURES OF THE DRAWING

FIG. 1 is a vertical cross-sectional view of a first embodiment according to the present invention, including three fixed optical elements.

FIG. 2 is a front view of the embodiment shown in FIG. 1.

FIG. 3 is a view of the embodiment shown in FIGS. 1 and 2, viewed in an opposed direction to FIG. 2.

FIG. 4 is a vertical cross-section of a second embodiment according to the present invention, including two fixed and one movable optical elements.

FIG. 5 is a front view of the embodiment shown in FIG. 4.

DESCRIPTION OF PREFERRED EMBODIMENTS

With reference to the embodiment disclosed in FIGS. 1, 2 and 3, an observation port assembly includes a boxshaped part 1, arranged at a through hole or aperture in a door 2.

The box shaped part 1 includes a front wall 3, arranged in a parallel relationship to the outside plane 4 of the door 3, and at a distance from said plane 4. Two inclined wall portions, 5, 6, extend from the front wall 3 in direction towards the outside plane 4 of the door 2, having an angle of inclination of approximately 45° in the shown embodiment. Two port holes, 8 and 9 respectively, are located centrally on the inclined wall portions 5, 6, extending inwardly towards the door 2. Also the front wall 3 is arranged with a port hole 7, extending towards the door 2. All port holes, 7, 8 and 9 respectively, are attached to respective wall portion 3, 5, 6 by means of a nut 10, 11, 12. The front wall portions 3, 5, 6 of the boxshaped part 1 are joined to a front plate 13 or rear wall by means of a number of wall portions 14, 15, 16, 17. Said rear wall is also arranged with an elongated slot 19, and four nuts 20, 21, 22, 23 are also arranged to faciliate attachment of the boxshaped part 1.

When attaching the boxshaped part 1 to a door 2, a mounting plate 24 arranged with four holes for four attachment bolts or screws 25, 26, 27, 28 is utilized. Furthermore. the mounting plate 24 is also arranged with a rectangular slot 29. A number of triangular planes 30, 30', 31, 31', 32, 32' are arranged to join the front wall portions 3, 5, 6 with the front plate 13 in such a way, that they form inclined facet surfaces, which prevent the removal of the boxshaped part 1 from the outside plane 4 of the door 2, since no engagement surfaces for a tool exist.

With the embodiment described above and shown in FIGS. 1 – 3, it is possible to achieve a field of view, permitting visual control of a sector exceeding 180°. Said control is carried out by simultaneous viewing of the port hole 7, 8, 9 lense system oculars, directed towards the viewer.

A modified embodiment is shown in FIGS. 4 and 5, including a boxshaped part 1' with two inclined wall portions arranged as previously described with reference to the first embodiment. However, the front wall portion comprises of a circular plane 33, arranged with a slot or recess 34. Said plane 33 is together with planes 35, 35', 36, 36', 37, 37' joined to one unit with a front plate 39.

A cylindrically shaped part 40 is rotatably arranged immediately behind the circular plane 33. A port hole 41 is arranged at the cylindrically shaped part 40, extending towards an opposed aperture 45, arranged in the cylindrically shaped part 40. A number of spikes 42 extend from the cylindrically shaped part 40, attached to a bearing 43, which is rotatably attached to an axle 44. The box shaped part 1' is attached by means of a number of bolt or screw members 46, 47, 48, 49 to a mounting plate 50.

The last described embodiment permits an enlarged field of view in the vertical plane, since the centrally arranged port hole 41 can be manually turned to a desired position relatively the horizontal plane. However, this method is only suitable in those cases, in which movement of the port hole 41 is not disadvantageous for the viewer, since said movement can be noted by the person or persons located adjacent to the device. The device could also be pre-set, in order to faciliate viewing of a certain area, in which case further turning/adjustment operation is unnecessary.

The embodiments shown and described include three optical port holes, a number which can be varied from two and upwards, depending partly on the wide angle or panoramic effect achieved from different types of optical elements, partly also depending on desired field of viewing. It is easily understood, that the device can be arranged for a field of viewing exceeding 180°, both in the vertical as well as the horizontal plane.

The device according to the present invention is therefore in no way restricted to the two embodiments shown and described, since many other embodiments are possible within the framework of the inventive thought and the following claims.

I claim:

1. An observation port assembly in combination with a vertical panel, such as a door or the like and in which said vertical panel includes inner and outer vertical surfaces, said vertical panel having a through-aperture in which said observation port assembly is mounted for permitting an observer, at the inner surface of the vertical panel, to unobtrusively observe the area at the outer surface of the vertical panel, the improvement characterized in that said observation port assembly comprises:

a box-shaped housing part including means for fixed attachment to the outer surface of said vertical panel and in said through aperture, said box-shaped housing part including a plurality of separate optical viewing elements each having viewing-oculars adjacent each other and accessible for viewing from the inner surface of said vertical panel, the separate optical viewing elements having a linear optical axis at a predetermined angular relationship to the linear optical axis of an adjacent optical viewing element, the box-shaped housing part including a portion projecting beyond the outer surface of said vertical panel and comprising diverse surface portions in which said viewing elements are fixedly mounted, said housing part having an inner wall, and fastening means extending from said inner wall of said housing part and the inner surface of said vertical panel, said housing part enclosing said fastening means and preventing access to said fastening means from the outer surface of said vertical panel.

2. The structure as claimed in claim 1, in which the outer surface of said box-shaped housing part comprises a plurality of planer surfaces inclined relative to each other and forming a facet-shaped surface in which at least some of said separate optical viewing elements are fixedly mounted.

3. The structure as claimed in claim 1, including a rotatable member displaceably mounted within said box-shaped housing and having at least one of said separate optical viewing elements mounted therein and having a linear optical axis displaceable relative to said box-shaped housing part for scanning at the outer surface of said vertical panel.

4. The structure as claimed in claim 1, in which said fastening means comprises a plurality of threaded fasteners, and a mounting plate at the inner surface of said vertical panel through which a portion of said threaded fasteners project.

5. The structure as claimed in claim 4, in which said mounting plate includes an elongated slot in alignment with an inner end portion of each of said optical viewing elements.

* * * * *